(12) United States Patent
Horton

(10) Patent No.: US 8,693,667 B2
(45) Date of Patent: Apr. 8, 2014

(54) SYSTEMS AND METHODS FOR PROCESSING TELEPHONE CALLS

(75) Inventor: Chad D. Horton, Broken Arrow, OK (US)

(73) Assignee: Verizon Business Global LLC, Basking Ridge, NJ (US)

( * ) Notice: Subject to any disclaimer, the term of this patent is extended or adjusted under 35 U.S.C. 154(b) by 3135 days.

(21) Appl. No.: 11/041,402

(22) Filed: Jan. 25, 2005

(65) Prior Publication Data

US 2006/0177037 A1 Aug. 10, 2006

(51) Int. Cl.
*H04M 7/00* (2006.01)

(52) U.S. Cl.
USPC ............ 379/221.13; 379/221.14; 379/216.01; 379/233

(58) Field of Classification Search
USPC ........... 379/221.13, 221.14, 216.01, 233, 165
See application file for complete search history.

(56) References Cited

U.S. PATENT DOCUMENTS 6,061,450 A * 5/2000 Bauer ...................... 379/207.15

OTHER PUBLICATIONS

North American Numbering Plan (NANP) Expansion Reference Document, Alliance for Telecommunications Industry Solutions, Industry Number Committee, Aug. 16, 2002.*
Bellaire, James, various pages from http://telecomindiana.com/npax, print date Jan. 10,.2005, 11 pages.
"LincMad Telephone Area Codes & Splits," www.linkmad.com, Nov. 13, 2000, 4 pages.
Epstein, Norman, "Rationale for the Elimination of NANP Expansion Options by the INC," www.nanc-chair.org/docs/Sep/Sep02-INC-NANP-Expansion-Report.ppt, Sep. 2002, 10 pages.
Alliance for Telecommunications Industry Solutions, North American Numbering Plan (NANP) Expansion Reference Document, Aug. 16, 2002, 123 pages.

* cited by examiner

*Primary Examiner* — Duc Nguyen
*Assistant Examiner* — Yosef K Laekemariam

(57) ABSTRACT

A system includes a switching device. The switching device is configured to process a call request as a 12-digit telephone number in a first situation. The 12-digit telephone number includes an area code and 9 digits after the area code. The switching device is further configured to process the call request as a telephone number including less than 12 digits in a second situation.

24 Claims, 6 Drawing Sheets

SYSTEMS AND METHODS FOR PROCESSING TELEPHONE CALLS

FIELD OF THE INVENTION

Implementations consistent with the principles of the invention relate generally to communications systems and, more particularly, to systems and methods for processing telephone calls.

BACKGROUND OF THE INVENTION

The current North American Numbering Plan (NANP) is based on a 10-digit telephone number format that includes a three-digit area code (also called a Number Plan Area (NPA)), a three-digit central office prefix code, and a four-digit subscriber line number. The current NANP format can be represented as:

NXX-NXX-XXXX, where N can have a value between 2 and 9, and X can have a value between 0 and 9.

While the current NANP plan has worked well for past several decades, it is slowly approaching its capacity. The reasons for this are many. For example, back in the 1970's or even the 1980's, each family household was typically associated with a single telephone number. Today, it is not uncommon for each family member to have their own telephone number. For example, a typical household may have two or more telephone numbers associated with their house and one or more members of the household may have their own cell phone, each having a unique telephone number. This increased demand for telephone numbers has, among other factors, caused the existing 10-digit NANP to move toward its maximum capacity.

As the life cycle of the North American Numbering Plan (NANP) slowly approaches the need for serious expansion, several clever plans such as overlays, realignments, and splits, have been implemented to extend the life of the current 10-digit NANP. Long term planning by the Industry Numbering Committee (INC) has been underway to find the least intrusive and least confusing way to expand the dial plan when needed while sacrificing minimal integrity of the existing plan that everyone has grown to expect and rely on personally as well as economically.

Some proposed NANP expansion formats include increasing the number of digits in the area code (e.g., (N)XXX-XXX-XXXX or N(X)XX-XXX-XXXX), adding a National Destination Code (NDC) (a 1-digit code other than 0 or 1) to the beginning of the current 10-digit NANP (e.g., NDC+NXX-XXX-XXXX), or adding a 2-digit Steering Code (SC) to the beginning of the current 10-digit NANP (e.g., SC (2-digit)+NXX-XXX-XXXX). These proposed NANP expansion formats have a number of well-documented drawbacks, such as transition period problems, dialing problems or conflicts, adverse user impact, or regulatory issues.

SUMMARY OF THE INVENTION

In an implementation consistent with the principles of the invention, a method for processing a call request is provided. The method includes determining whether the call request is for a long distance call; processing the call request as a 12-digit telephone number when the call request is for a long distance call, where the 12-digit telephone number includes an area code and 9 digits after the area code; and processing the call request as a telephone number including less than 12 digits when the call request is not for a long distance call.

In another implementation consistent with the principles of the invention, a method for processing a call request that includes a telephone number is provided. The method includes determining whether the call request is for a local call; processing the call request as a telephone number including a first number of digits, where the first number of digits includes less than 12 digits; determining, when the call request is not for a local call, whether a first digit following an area code is a zero; processing the call request as a 12-digit telephone number when the first digit following the area code is a zero; and processing the call request as a 10-digit telephone number when the first digit following the area code is not a zero.

In still another implementation consistent with the principles of the invention, a method for processing a call request is provided. The call request includes a telephone number that includes an area code. The method includes determining whether a first digit following the area code in the telephone number is a zero; processing the call request as a 12-digit telephone number when the first digit following the area code is a zero; and processing the call request as a telephone number that includes less than 12 digits when the first digit following the area code is not a zero.

In still a further implementation consistent with the principles of the invention, a system includes a switching device. The switching device is configured to process a call request as a 12-digit telephone number in a first situation. The 12-digit telephone number includes an area code and 9 digits after the area code. The switching device is further configured to process the call request as a telephone number including less than 12 digits in a second situation.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the principles of the invention allow for conventional 7-digit and 10-digit telephone numbering plans to co-exist with a new 12-digit telephone numbering plan. In one implementation, the new 12-digit telephone numbering format includes the conventional 3-digit area code (or NPA), a new 4-digit community code, and a new 5-digit directory number. The new 12-digit telephone numbering format can be represented as follows:

NXX+(DX)XX+XXXXX, where N is a number from 2 to 9, X is a number from 0 to 9, and D is a 0 (or another predetermined number) during a transition period and can be any number from 0 to 9 after the transition period.

Telephone switches look at "dialed" digits serially (or sequentially). Therefore, an originating telephone switch does not immediately know how many digits are included in a dialed telephone number. Due to this type of digit collection, implementations consistent with the principles of the invention may expand the NANP format by adding two digits to the beginning of the central office prefix code, as described in greater detail below.

If a group of dialed digits includes an area code followed by a "0," the switch will immediately know that the new 12-digit telephone numbering plan has been used. If, on the other hand, the area code is not followed by a "0," then the switch will immediately know that the conventional 10-digit telephone numbering plan has been used.

Exemplary System

Figure 1:
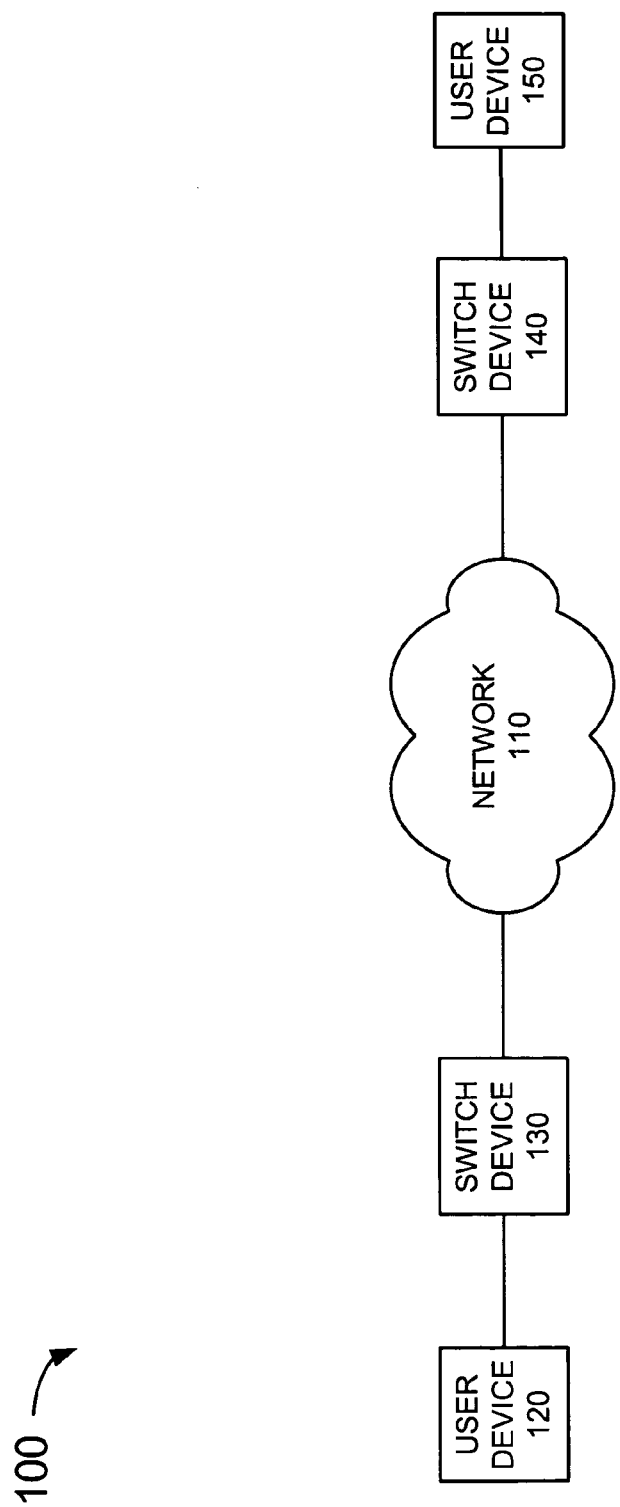
FIG. 1 illustrates an exemplary system in which systems and methods, consistent with the principles of the invention, may be implemented.

FIG. 1 illustrates an exemplary system 100 in which systems and methods, consistent with the principles of the invention, may be implemented. As illustrated, system 100 may include a network 110, user devices 120 and 150, and switch devices 130 and 140. The number of devices and networks illustrated in FIG. 1 is provided for simplicity. In practice, a typical system could include more or fewer devices and networks than illustrated in FIG. 1.

Network 110 may include one or more networks of any type, including a local area network (LAN), a metropolitan area network (MAN), a wide area network (WAN), a telephone network, such as the Public Switched Telephone Network (PSTN), a Public Land Mobile Network (PLMN), an intranet, the Internet, or a combination of networks. In one implementation consistent with the principles of the invention, network 110 may include a PSTN and possibly one or more other types of networks.

User devices 120 and 150 may include a device capable of placing or receiving a telephone call. In one implementation, devices 120 and 150 may include a type of telephone system, such as a plain old telephone system (POTS) telephone, a session initiation protocol (SIP) telephone, a wireless telephone device (e.g., a Personal Communications System (PCS) terminal that may combine a cellular radiotelephone with data processing, facsimile, and data communications capabilities, a Personal Digital Assistant (PDA) that can include a radiotelephone, a pager, Internet/intranet access, a Web browser, an organizer, a calendar, and/or a global positioning system (GPS), or the like), etc. In another implementation, devices 120 and 150 may include a type of computer system, such as a mainframe, minicomputer, personal computer, a laptop, or the like. Devices 120 and 150 may connect to switch devices 130 and 140, respectively, via any conventional technique, such as wired, wireless, or optical connections.

Switch devices 130 and 140 may include one or more network devices that aid in establishing telephone calls. In one implementation, switch devices 130 and 140 may include or be part of one or more central offices. While illustrated as being separate from network 110, it will be appreciated that switch devices 130 and 140 may be located within network 110 in other implementations consistent with the principles of the invention. Switch devices 130 and 140 may connect to network 110 via any conventional technique, such as wired, wireless, or optical connections.

Figure 2:
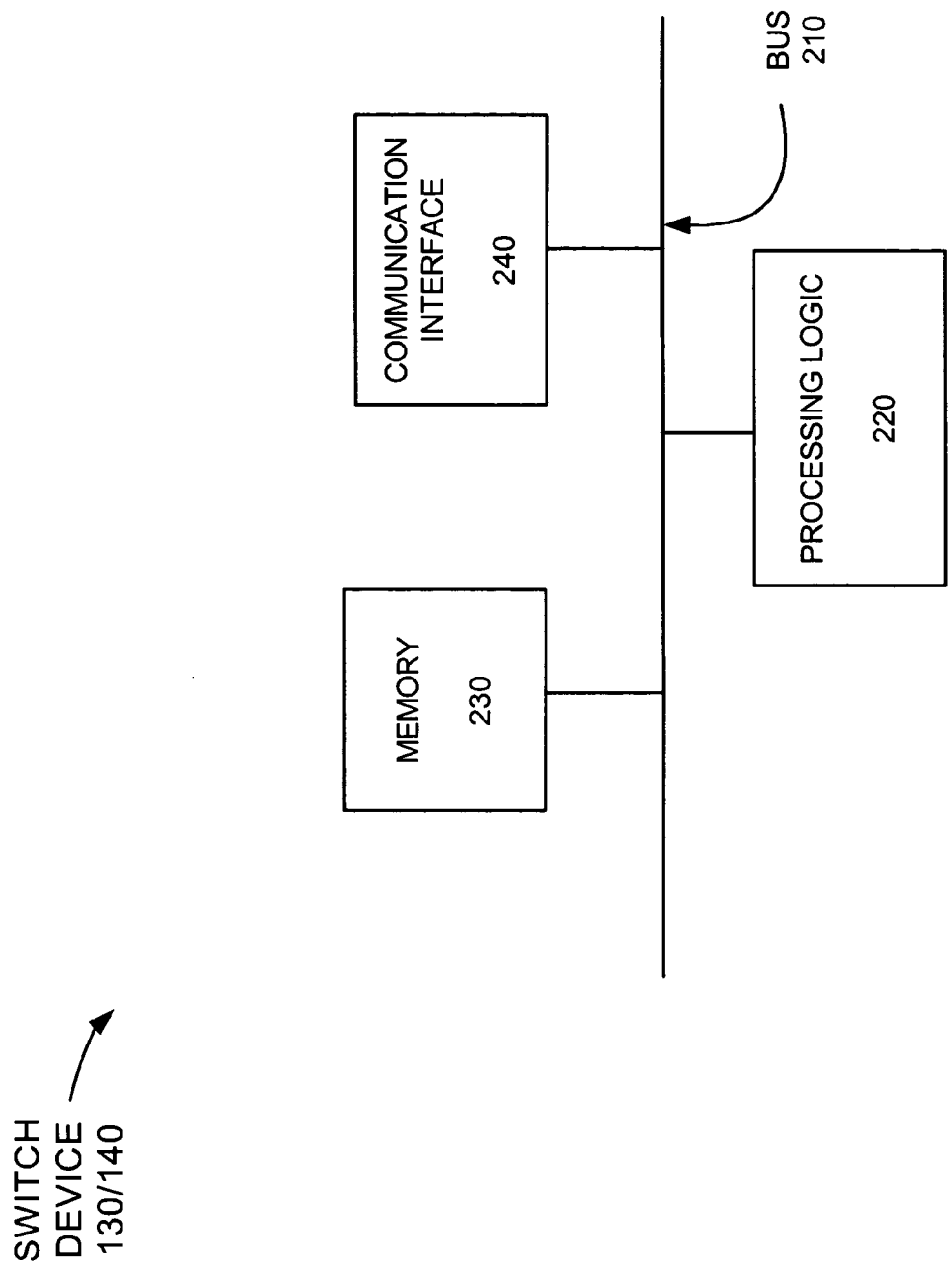
FIG. 2 illustrates an exemplary configuration of a switch device of FIG. 1 in an implementation consistent with the principles of the invention.

FIG. 2 illustrates an exemplary configuration of switch device 130 in an implementation consistent with the principles of the invention. It will be appreciated that switch device 140 may be similarly configured. As illustrated, switch device 130 may include a bus 210, processing logic 220, a memory 230, and a communications interface 240. It will be appreciated that switch device 130 may include other components (not shown) that aid in establishing telephone calls between two or more user devices 120/150.

Bus 210 may permit communication among the components of switch device 130. Processing logic 220 may include any type of conventional processor or microprocessor that interprets and executes instructions. In other implementations, processing logic 220 may be implemented as or include an application specific integrated circuit (ASIC), field programmable gate array (FPGA), or the like.

Memory 230 may include a random access memory (RAM) or another type of dynamic storage device that stores information and instructions for execution by processing logic 220, a read only memory (ROM) and/or another type of static storage device that stores static information and instructions for the processing logic 220, and/or some other type of magnetic or optical recording medium and its corresponding drive. Communication interface 240 may include any transceiver-like mechanism that enables switch device 130 to communicate with other devices and/or systems. For example, communication interface 240 may include mechanisms for communicating with another device or system via a network, such as network 110.

As will be described in detail below, switch device 130, consistent with the principles of the invention, may aid in establishing telephone calls using conventional 7-digit or 10-digit telephone numbering plans or a new 12-digit telephone numbering plan. Switch device 130 may perform these and other services in response to processing logic 220 executing software instructions contained in a computer-readable medium, such as memory 230. A computer-readable medium may be defined as one or more memory devices and/or carrier waves. The software instructions may be read into memory 230 from another computer-readable medium or from another device via communication interface 240. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Exemplary 12-Digit Numbering Format

As set forth above, implementations consistent with the principles of the invention provide 12-digit telephone number dialing. In one implementation, two digits may be added to the beginning of the central office prefix code and the existing 7-digit telephone number may be shifted two digits to the right, resulting in a 12-digit numbering plan. The conventional area code (or NPA code) may not be altered.

Figure 3:
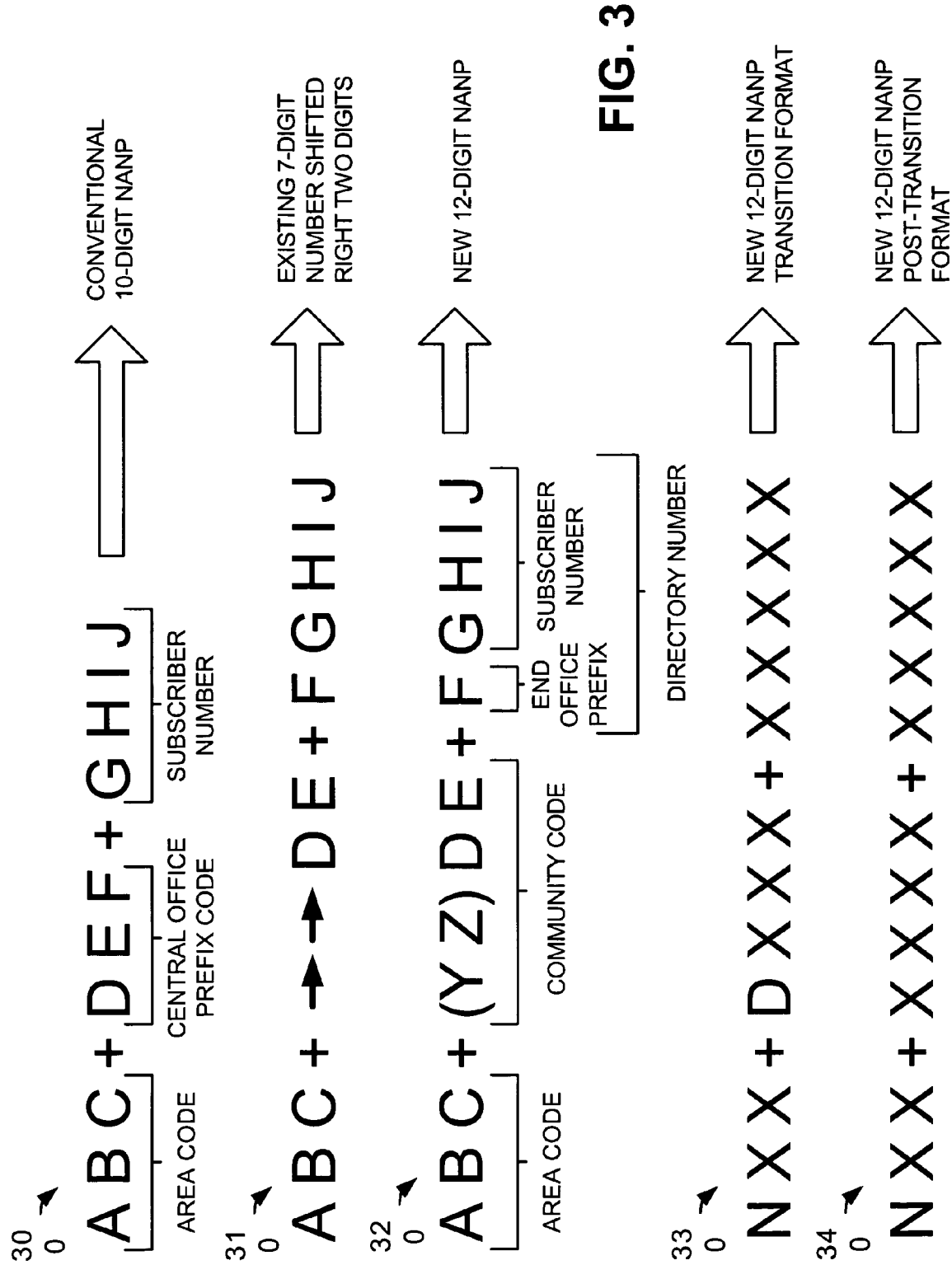
FIG. 3 illustrates the conversion of the existing 10-digit NANP format to a 12-digit format in one implementation consistent with the principles of the invention.

FIG. 3 illustrates the conversion of the existing 10-digit NANP format to a 12-digit format in one implementation consistent with the principles of the invention. As illustrated, the conventional 10-digit NANP format 300 includes a 3-digit area code, a 3-digit central office prefix code, and a 4-digit subscriber number. The 3-digit area code includes digits A, B, and C. The central office prefix code includes digits D, E, and F. And, the subscriber number includes digits G, H, I, and J.

In an implementation consistent with the principles of the invention, the central office prefix code and the subscriber number may be shifted two digits to the right and two digits (labeled digits Y and Z) may be added to the beginning of the central office prefix code (see 310, FIG. 3). In so doing, the last digit of the central office prefix code (i.e., digit F) may be shifted from the central office prefix code to the subscriber number, thereby creating a new 4-digit central office prefix code (referred to hereinafter as a "community code") and a new 5-digit subscriber number (referred to hereinafter as a "directory number"). The shift of digits to the right creates a five-digit directory number using the last digit of the old prefix code which in effect combines 10 old central office prefix codes or exchanges into a single "super" prefix code or exchange (e.g., central office prefix codes 550, 551, 552, . . . , 559 become 55). In this way, a new super prefix code may no longer be associated with a single central office switch, but instead may be associated with multiple switches in a given city or area.

As illustrated in FIG. 3, the new 12-digit NANP format 320 includes a 3-digit area code, a 4-digit community code, and a 5-digit directory number. The 3-digit area code continues to include digits A, B, and C; the community code includes new digits Y and Z, along with digits D and E from the conventional central office prefix code; and the directory number includes the end office prefix F from the conventional central office prefix code, along with digits G, H, I, and J from the conventional subscriber number.

During the period in which subscribers are being transitioned from dialing 7-digit or 10-digit numbers to 12-digit numbers, the 12-digit NANP may have the following format (see 330, FIG. 3):

NXX+(DX)XX+XXXXX where N is a number from 2 to 9, X is a number from 0 to 9, and D (which is the Y digit in FIG. 3) is 0 (or some other predetermined number or character). Processing of telephone calls during the transition period is described in detail below. After the transition period, the restriction on the value of the Y digit (FIG. 3) may be removed, resulting in the following 12-digit NANP format (see 340, FIG. 3):

NXX+(XX)XX+XXXXX where:

NXX=(Area Code—office independent) the conventional three-digit NPA;

(XX)XX=(Community Code—office independent) a four-digit code with two additional digits added to the remaining first two digits of the historic central office prefix code; and XXXXX=(End Office Prefix+Subscriber Number=Directory Number—office dependent) a five-digit line number created by shifting the historic prefix code "F" digit into the subscriber number field.

As an example, assume for explanatory purposes that digits Y and Z (FIG. 3) are each set to "0." Therefore, these values (i.e., "00") would be inserted at the beginning of the historic central office prefix code and the existing 7-digit number would be shifted down two digits. The telephone number "918-555-1212" would thus become "918-0055-51212." In this way, the area code would remain unchanged, thereby preserving the geographic recognition of this code.

Exemplary Call Establishment Processes

Figure 4:
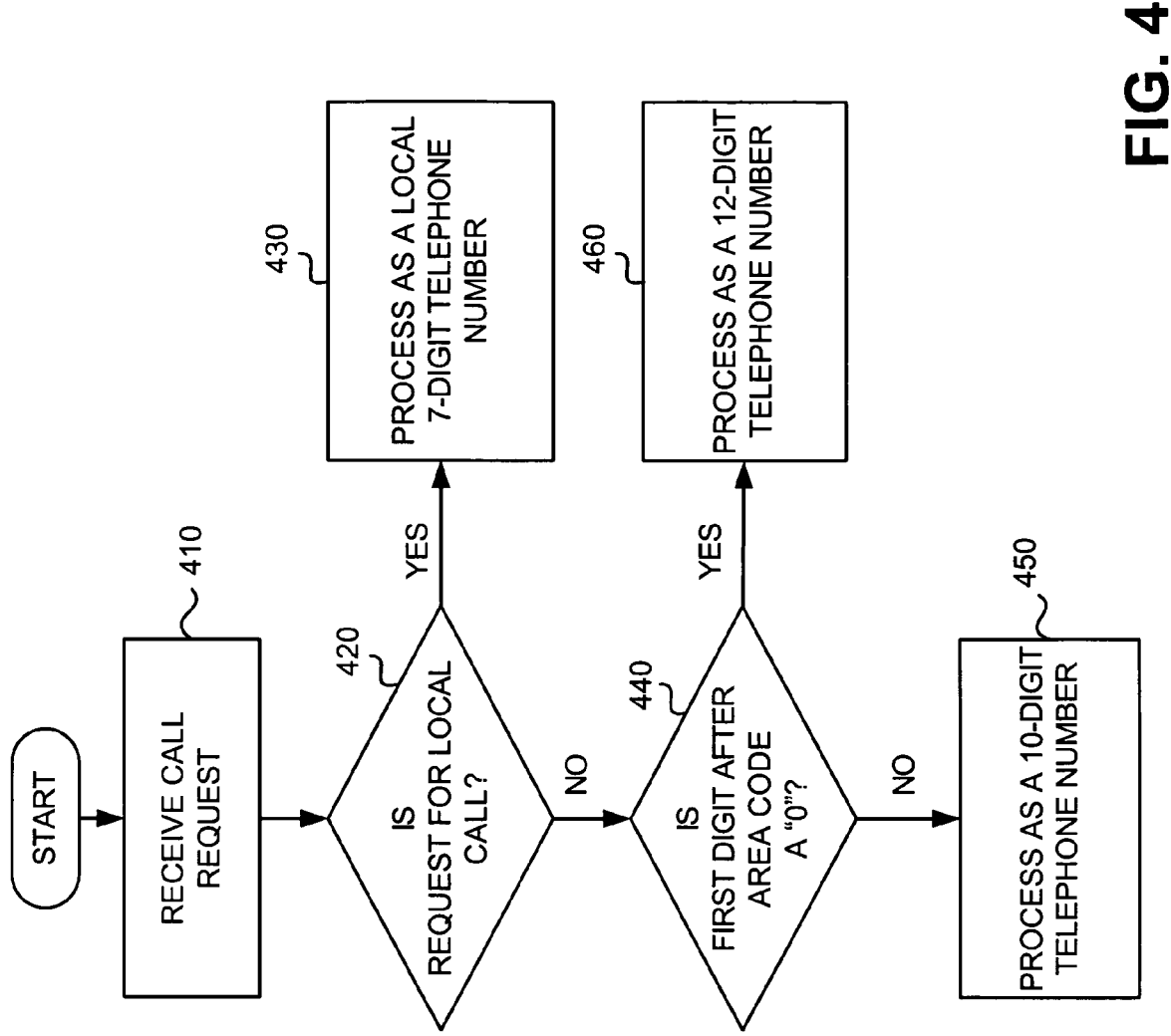
FIG. 4 illustrates an exemplary process for establishing a telephone call during a transition period in an implementation consistent with the principles of the invention.

FIG. 4 illustrates an exemplary process for establishing a telephone call during a transition period (i.e., a period in which subscribers are being transitioned to the new 12-digit NANP format) in an implementation consistent with the principles of the invention. In this implementation, it is assumed that the area from which the telephone call is being placed allows for local 7-digit telephone number dialing.

The exemplary process may begin with switch device 130 receiving a telephone call establishment request from a calling party using a user device, such as user device 120 (FIG. 1) (act 410). The request may be received in response to the calling party initiating a call to a desired called party. The calling party may initiate the call by, for example, dialing a telephone number associated with the called party. The telephone call establishment request may include the dialed digits.

Switch device 130 may determine whether the request is for a local telephone call (act 420). As indicated above, telephone switches look at "dialed" digits serially (or sequentially). Therefore, switch device 130 may determine whether a request is for a local call by examining the first few digits of the dialed number. For example, if the calling party dialed "1" followed by other digits, this may be an indication that the calling party is trying to establish a long distance telephone call.

If the request is for a local telephone call, switch device 130 may process the received digits as a 7-digit telephone number and establish a telephone call to the called party based thereon (act 430). As indicated above, in this implementation, it is assumed that the area from which the telephone call is being placed allows for 7-digit telephone number dialing.

If, on the other hand, the request is not for a local telephone call, switch device 130 may determine if the first digit after the area code is a "0" (act 440). As indicated above, during the transition period, digit Y of the 12-digit NANP format (FIG. 3) may be restricted to a value of "0." Therefore, if switch device 130 detects a number other than a zero after the area code, switch device 130 may process the received digits as a 10-digit telephone number and establish a telephone call to the called party based thereon (act 450). That is, switch device 130 may process the call request as a conventional 10-digit NANP number.

If switch device 130 detects a "0" after the area code, switch device 130 may process the received digits as a 12-digit telephone number and establish a telephone call to the called party based thereon (act 460). That is, switch device 130 may process the call request as a 12-digit NANP number.

The following examples illustrate the above transition period processing. Assume that a user at user device 120 dials the following telephone number "555-1212." Switch device 130 may readily identify the dialed telephone number as a local call due, for example, to the absence of a "1" as the first received digit. Switch device 130 may then establish a telephone call to the subscriber associated with telephone number "555-1212."

Assume, as another example, that a user at user device 120 dials the following telephone number "1+918-555-1212." Switch device 130 may readily identify the dialed telephone number as a long distance call due, for example, to the presence of a "1" as the first received digit. Switch device 130 may then determine that the three digits received after the "1" (i.e., digits "918") are part of the area code. Since the digit following the area code is not a "0," switch device 130 may determine that conventional 10-digit NANP dialing has been used.

Switch device may establish a telephone call to the subscriber associated with telephone number "918-555-1212."

Assume, as a third example, that a user at user device 120 dials the following telephone number "1+918-0055-51212." Switch device 130 may readily identify the dialed telephone number as a long distance call due, for example, to the presence of a "1" as the first received digit. Switch device 130 may then determine that the three digits received after the "1" (i.e., digits "918") are part of the area code. Since the digit following the area code is a "0," switch device 130 may determine that 12-digit NANP dialing has been used. Switch device may establish a telephone call to the subscriber associated with telephone number "918-0055-51212."

Figure 5:
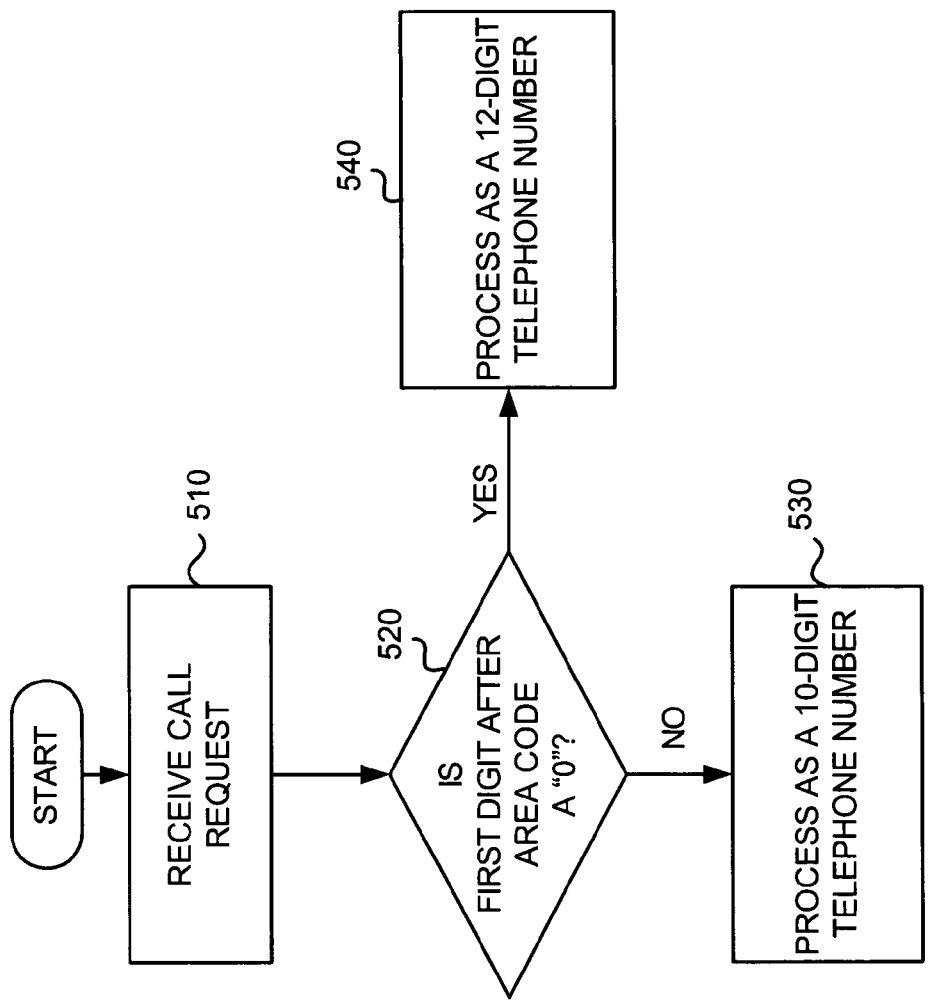
FIG. 5 illustrates an exemplary process for establishing a telephone call during a transition period in another implementation consistent with the principles of the invention.

FIG. 5 illustrates an exemplary process for establishing a telephone call during a transition period (i.e., a period in which subscribers are being transitioned to the new 12-digit NANP format) in another implementation consistent with the principles of the invention. In this implementation, it is assumed that the area from which the telephone call is being placed allows for local 10-digit telephone number dialing.

The exemplary process may begin with switch device 130 receiving a telephone call establishment request from a calling party using a user device, such as user device 120 (FIG. 1) (act 510). The request may be received in response to the calling party initiating a call to a desired called party. The calling party may initiate the call by, for example, dialing a telephone number associated with the called party. The telephone call establishment request may include the dialed digits.

Since 10-digit local dialing is in effect in the area from which the telephone call is placed, local and long distance telephone calls will include an area code. Switch device 130 may determine if the first digit after the area code is a "0" (act 520). As indicated above, during the transition period, digit Y of the 12-digit NANP format (FIG. 3) may be restricted to a value of "0." Therefore, if switch device 130 detects a number other than a "0" after the area code, switch device 130 may process the received digits as a 10-digit telephone number and establish a telephone call to the called party based thereon (act 530). That is, switch device 130 may process the call request as a conventional 10-digit NANP number.

If, on the other hand, switch device 130 detects a "0" after the area code, switch device 130 may process the received digits as a 12-digit telephone number and establish a telephone call to the called party based thereon (act 540). That is, switch device 130 may process the call request as a 12-digit NANP number.

The following examples illustrate the above transition period process. Assume that a user at user device 120 dials the following telephone number "918-555-1212." Since 10-digit NANP dialing is permissible in the area from which the telephone call is placed, switch may determine that the first three digits that were dialed (i.e., "918") are part of the area code. Since the digit following the area code is not a "0," switch device 130 may determine that conventional 10-digit NANP dialing has been used. Switch device may establish a telephone call to the subscriber associated with telephone number "918-555-1212."

Assume, as another example, that a user at user device 120 dials the following telephone number "918-0055-51212." Switch device 130 may determine that the first three digits received are part of the area code. Since the digit following the area code is a "0," switch device 130 may determine that 12-digit NANP dialing has been used. Switch device may establish a telephone call to the subscriber associated with telephone number "918-0055-51212."

Figure 6:
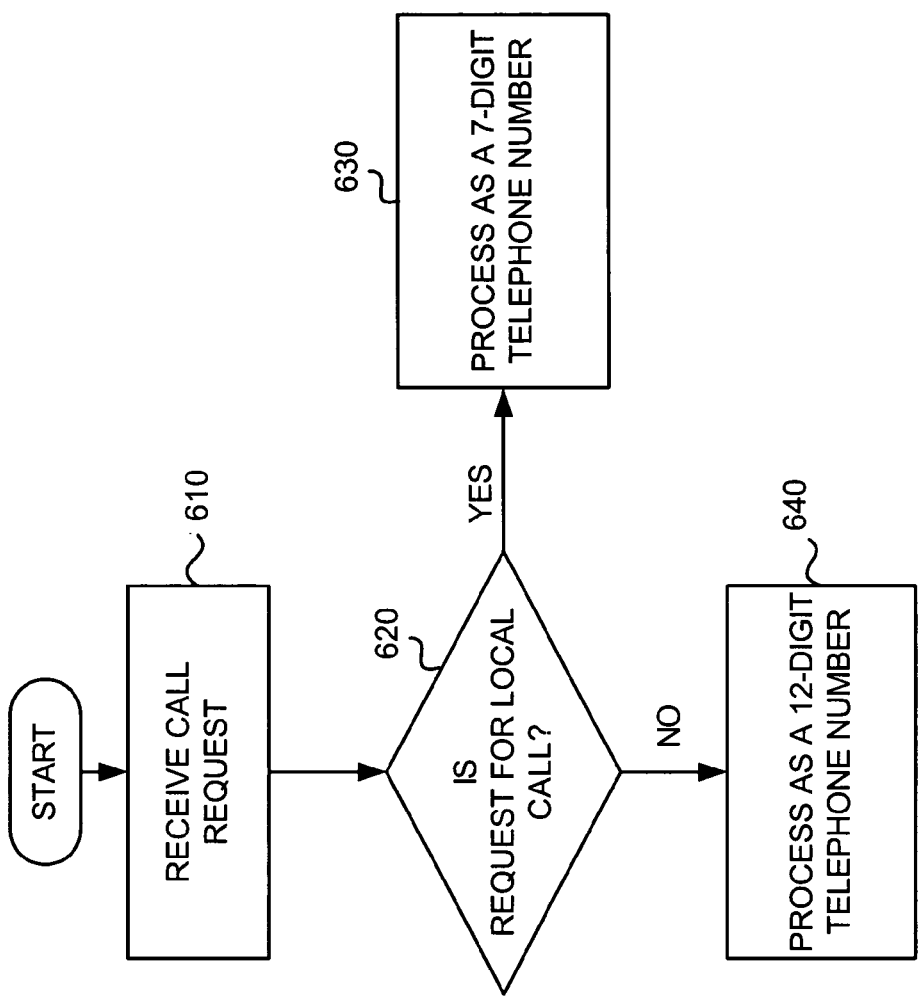
FIG. 6 illustrates an exemplary process for establishing a telephone call after the transition period has ended in an implementation consistent with the principles of the invention.

FIG. 6 illustrates an exemplary process for establishing a telephone call after the transition period (i.e., a period in which subscribers are being transitioned to the new 12-digit NANP format) has ended in an implementation consistent with the principles of the invention. In this implementation, it is assumed that the area from which the telephone call is being placed still allows for local 7-digit telephone number dialing.

The exemplary process may begin with switch device 130 receiving a telephone call establishment request from a calling party using a user device, such as user device 120 (FIG. 1) (act 610). The request may be received in response to the calling party initiating a call to a desired called party. The calling party may initiate the call by, for example, dialing a telephone number associated with the called party. The telephone call establishment request may include the dialed digits.

Switch device 130 may determine whether the request is for a local telephone call (act 620). As indicated above, telephone switches look at "dialed" digits serially (or sequentially). Therefore, switch device 130 may determine whether a request is for a local call by examining the first few digits of the dialed number. For example, if the calling party at user device 120 dialed "1" followed by other digits, this may be an indication that the user is trying to establish a long distance telephone call.

If the request is for a local telephone call, switch device 130 may process the received digits as a 7-digit telephone number and establish a telephone call to the called party based thereon (act 630). As indicated above, in this implementation, it is assumed that the area from which the telephone call is being placed allows for 7-digit telephone number dialing.

If, on the other hand, the request is not for a local telephone call, switch device 130 may process the received digits as a 12-digit telephone number and establish a telephone call to the called party based thereon (act 640). That is, switch device 130 may process the call request as a 12-digit NANP number.

The following examples illustrate the above processing. Assume that a user at user device 120 dials the following telephone number "555-1212." Switch device 130 may readily identify the dialed telephone number as a local call due, for example, to the absence of a "1" as the first received digit. Switch device 130 may then establish a telephone call to the subscriber associated with telephone number "555-1212."

Assume, as another example, that a user at user device 120 dials the following telephone number "1+918-0055-51212." Switch device 130 may readily identify the dialed telephone number as a long distance call due, for example, to the presence of a "1" as the first received digit. Switch device 130 may then establish a telephone call to the subscriber associated with telephone number "918-0055-51212."

While the above implementations describe how 7-digit local dialing can coexist with the new 12-digit NANP format, it will be appreciated that implementations consistent with the principles of the invention may also allow for 8-digit, 9-digit, or 10-digit local dialing to coexist with the new 12-digit format during and after the transition period.

Implementations consistent with the principles of the invention provide more than a 100-fold increase in the quantity of available telephone numbers over the existing 10-digit NANP, by increasing the number of central office prefix codes from 800 to 10,000 and the number of subscriber numbers from 10,000 to 100,000. Moreover, by adding digits to the central office prefix code, implementations consistent with the invention preserve the integrity of special codes, such as "911."

Conclusion

Implementations consistent with the principles of the invention provide a new 12-digit telephone numbering plan that expands the conventional 10-digit NANP by more than 100 fold. Moreover, implementations consistent with the principles of the invention allow for conventional 7-digit, 8-digit, 9-digit, and 10-digit telephone numbering plans to co-exist with the new 12-digit telephone numbering plan.

The foregoing description of exemplary implementations of the invention provides illustration and description, but is not intended to be exhaustive or to limit the invention to the precise form disclosed. Modifications and variations are possible in light of the above teachings or may be acquired from practice of the invention. For example, while the above description focused on functions performed by a switch device, it will be appreciated that some or all of the functions described above may be implemented by one or more other devices in system 100.

While series of acts have been described with respect to FIGS. 4-6, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for processing a call request by a switch device, the method comprising:
   determining, by processing logic of the switch device, whether the call request is for a long distance call;
   processing, by the processing logic, the call request as a 12-digit telephone number when the call request is for a long distance call,
      the 12-digit telephone number including an area code and 9 digits after the area code,
      the 12-digit telephone number including a format of NXX+XXXX+XXXXX,
         N representing a value from 2 to 9 and X representing a value from 0 to 9; and
   processing, by the processing logic, the call request as a telephone number including less than 12 digits when the call request is not for a long distance call,
      processing the call request as a telephone number including less than 12 digits including:
         processing the call request as a 7-digit telephone number,
         processing the call request as an 8-digit telephone number,
         processing the call request as a 9-digit telephone number, or
         processing the call request as a 10-digit telephone number.

2. The method of claim 1 where the area code includes 3 digits.

3. A method, performed by a switch device, for processing a call request that includes a telephone number, the method comprising:
   determining, by processing logic of the switch device, whether the call request is for a local call;
   processing, by the processing logic, the call request as a telephone number including a first number of digits,
      the first number of digits including less than 12 digits;
   determining, by the processing logic and when the call request is not for a local call, whether a first digit following an area code is a zero;
   processing, by the processing logic, the call request as a 12-digit telephone number based on the determining that the first digit following the area code is a zero,
      the 12-digit telephone number including a format of NXX+DXXX+XXXXX,
         N representing a value from 2 to 9, X representing a value from 0 to 9, and D representing a 0; and
   processing, by the processing logic, the call request as a 10-digit telephone number based on determining that the first digit following the area code is not a zero.

4. The method of claim 3 where the first number of digits includes 7 digits.

5. The method of claim 3 where the first number of digits includes 8 digits.

6. The method of claim 3 where the first number of digits includes 9 digits.

7. The method of claim 3 where the first number of digits includes 10 digits.

8. The method of claim 3 where the area code includes 3 digits.

9. The method of claim 3 where the 12-digit telephone number includes 9 digits after the area code.

10. The method of claim 3, where a digit immediately following the first digit following the area code is a value from 0-9.

11. A system comprising:
    a switching device to:
       process a call request as a 12-digit telephone number in a first situation,
          the 12-digit telephone number including an area code and 9 digits after the area code,
          the 12-digit telephone number including a format of NXX+DXXX+XXXXX,
             N representing a value from 2 to 9, X representing a value from 0 to 9, and D representing a 0, and
       process the call request as a telephone number including less than 12 digits in a second situation,
          when process the call request as a telephone number including less than 12 digits, the switching device is to:
             process the call request as a 7-digit telephone number,
             process the call request as an 8-digit telephone number,
             process the call request as a 9-digit telephone number, or
             process the call request as a 10-digit telephone number.

12. The system of claim 11 where the first situation includes a situation where a first digit following the area code is a zero and the second situation includes a situation where the first digit following the area code is not a zero.

13. The system of claim 11 where the first situation includes a request for a long distance telephone call and the second situation includes a request for a local telephone call.

14. The system of claim 11 where the telephone number including less than 12 digits includes 7 digits.

15. The system of claim 11 where the telephone number including less than 12 digits includes 8 digits.

16. The system of claim 11 where the telephone number including less than 12 digits includes 9 digits.

17. The system of claim 11 where the telephone number including less than 12 digits includes 10 digits.

18. A system for processing a call request that includes a telephone number, the system comprising:
    a device to:
        determine whether the call request is for a local call;
        process the call request as a telephone number including
            a first number of digits,
            the first number of digits including less than 12 digits;
        determine, when the call request is not for a local call, whether a first digit following an area code is a zero;
        process the call request as a 12-digit telephone number based on determining that the first digit following the area code is a zero,
            the 12-digit telephone number including a format of NXX+DXXX+XXXXX,
            N representing a value from 2 to 9, X representing a value from 0 to 9, and D representing a 0; and
        process the call request as a 10-digit telephone number based on determining that the first digit following the area code is not a zero.

19. The system of claim 18 where the first number of digits includes 7 digits.

20. The system of claim 18 where the first number of digits includes 8 digits.

21. The system of claim 18 where the first number of digits includes 9 digits.

22. The system of claim 18 where the first number of digits includes 10 digits.

23. The system of claim 18 where the area code includes 3 digits.

24. The system of claim 18 where the 12-digit telephone number includes 9 digits after the area code.

* * * * *